June 28, 1966     V. P. DONNER     3,258,028
PRESSURE RELIEF VALVE
Filed Aug. 27, 1963     2 Sheets-Sheet 1
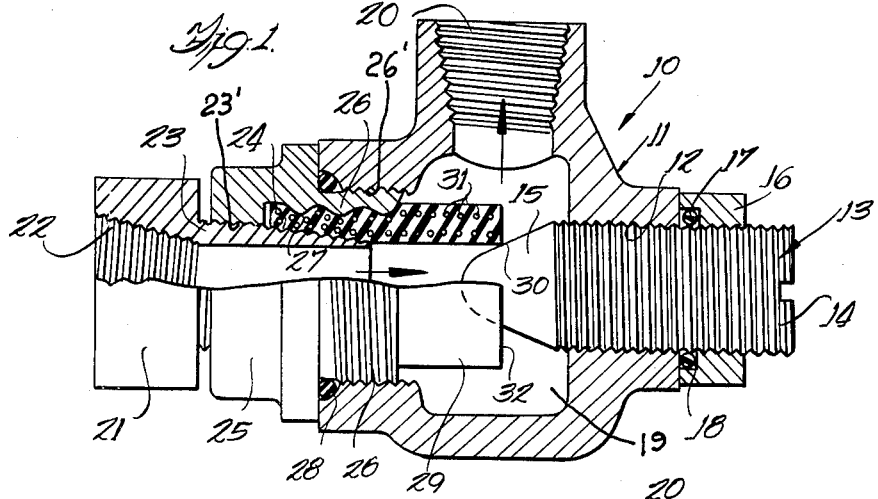
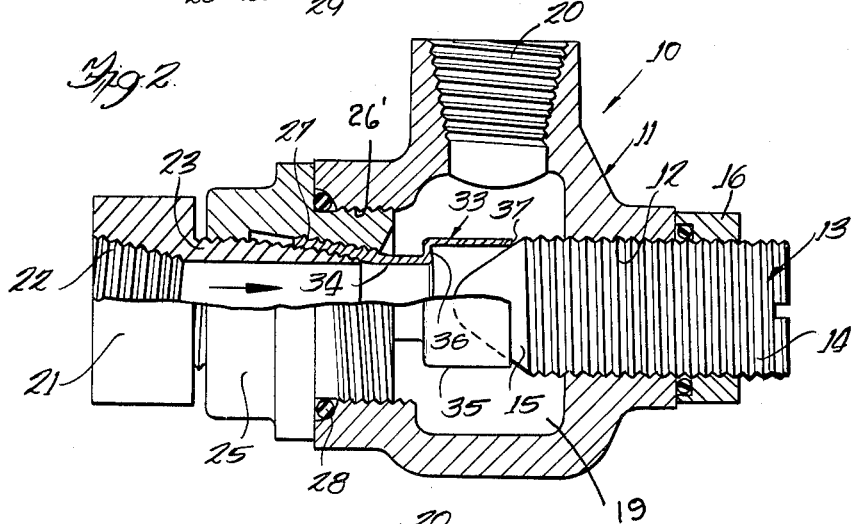
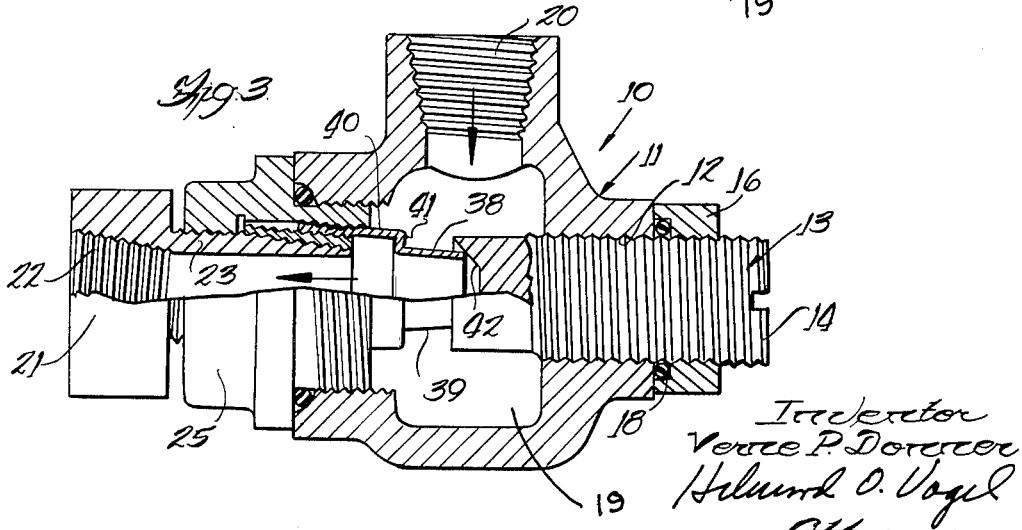
Inventor
Verne P. Donner
Helmuth O. Vogel
Attorney June 28, 1966  V. P. DONNER  3,258,028
PRESSURE RELIEF VALVE
Filed Aug. 27, 1963　　2 Sheets-Sheet 2
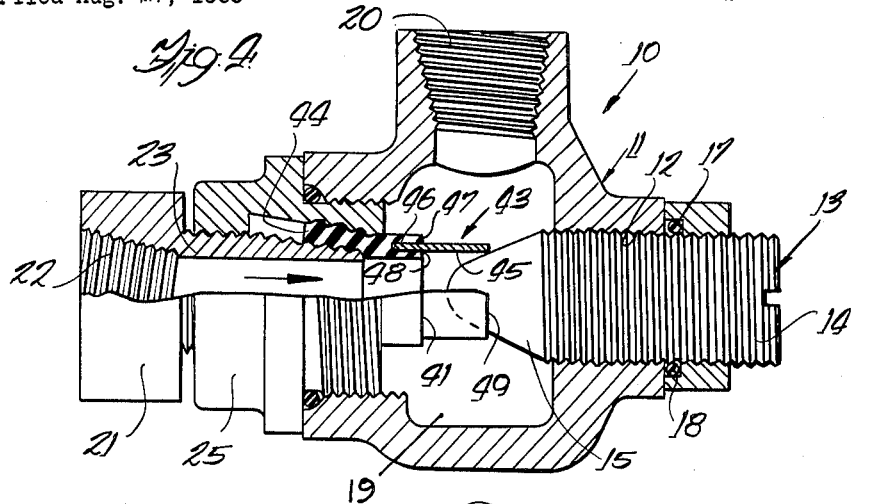
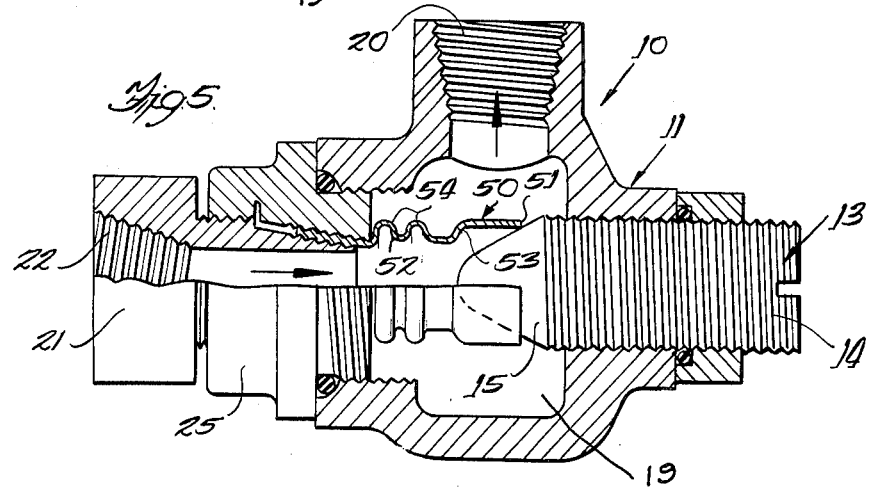
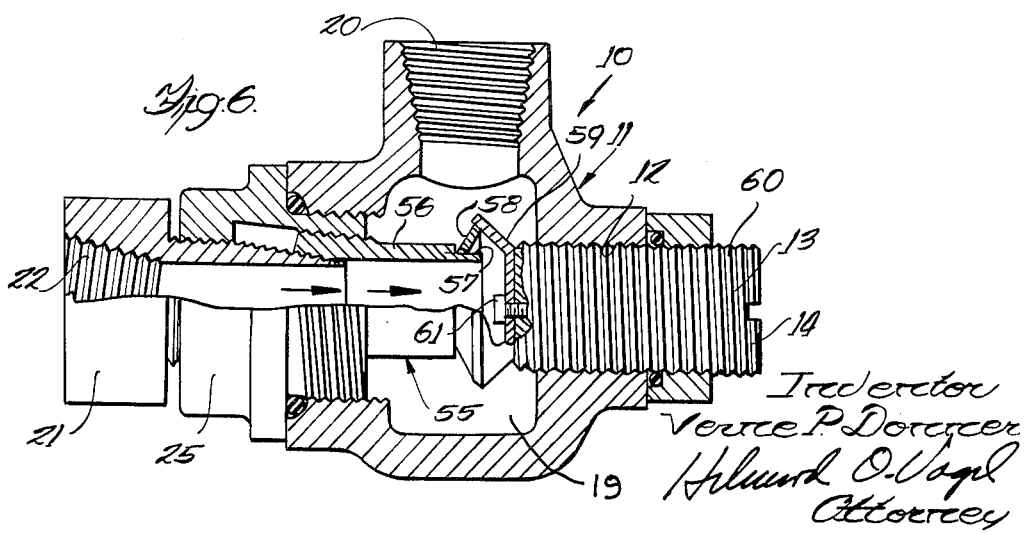
Inventor
Vence P. Donner
Helmuth O. Vogl
Attorney United States Patent Office 3,258,028
Patented June 28, 1966

3,258,028
PRESSURE RELIEF VALVE
Verne P. Donner, Box 70a, R.R. 2, Frost Road,
Palatine, Ill.
Filed Aug. 27, 1963, Ser. No. 304,779
2 Claims. (Cl. 137—508)

This invention relates to an improvement in valves and more particularly to an improved fluid pressure relief valve.

A primary object is to provide an improved simplified pressure relief valve having a minimum of moving elements which is simple in operation and economical in manufacture and maintenance.

The conventional pressure relief valve usually is provided with springs, diaphragms, weights, and other elements which provide a complex and expensive structure which may easily fail during service and which is costly to replace. Such valves contain a large number of moving parts and in many instances require pilot-operated mechanisms which also are costly and complex. The present invention achieves the prime object of simplicity, economy, and long life by means of a valve having few elements including only a minimum of moving parts.

It is a further object to provide an improved pressure relief valve which is pressure responsive and functions solely by virtue of the inherent characteristics of the valve element and the materials contained therein, the said valve element controlling the liquid flow through the valve.

It is a further object to provide an improved pressure relief valve which cannot malfunction due to sticking during service and which cannot fail in an unsafe altitude.

It is also an object of the invention to provide an improved pressure relief valve which is operable in any position in which the valve may be utilized.

A more specific object is to provide an improved valve having a cylindrical valve element which controls the fluid flow through said valve by the inherent deformability of the material of the tubular element thus requiring no other devices such as springs, diaphragms, etc.

A still further object is to provide an improved relief valve including a tubular valve member that is ideally suited to fluid flow which may have abrasives or foreign matter contained therein and which will not result in excessive erosion of the parts, which would be the case in a more complex pressure relief valve.

These and other objects will become more readily apparent from a reading of the description and an examination of the accompanying sheets of drawings in which:

FIGURE 1 is a cross sectional view, partially in elevation, of an improved pressure relief valve;

FIGURE 2 is a cross sectional view, partially in elevation, of a modified pressure relief valve;

FIGURE 3 is a cross sectional view, partially in elevation, of another modified pressure relief valve;

FIGURE 4 is a cross sectional view, partially in elevation, of another modified pressure relief valve;

FIGURE 5 is a cross sectional view, partially in elevation, of a modified pressure relief valve having a bellows-like cylindrical valve element; and FIGURE 6 is a cross-sectional view, partially in elevation, of another modified relief valve having a cylindrical valve element including a washer-like pressure responsive means.

A general description of the present invention comprises a valve body having a pair of passages which are adapted to communicate with each other through a valve chamber. An adjustable valve element is connected to the body and projects into the chamber, the end of the valve element being provided with a conical, tapering, spherical, or similarly shaped closure abutment. A second valve element, also disposed within the chamber, comprises a cylindrical member which is in communication with one of the passages and which includes an open end normally in mating relation with the conical, spherical, etc. abutment of the first valve element. In the normal position, the open end of the second valve element engages the abutment to restrict the fluid flow therethrough. Fluid, in the form of liquid or gas under pressure, is applied through one passage into the cylindrical member where its exit is blocked or restricted by the abutment or first valve element. At a predetermined pressure within the cylindrical member, it is enlarged or expanded slightly. Also and more importantly, the fluid pressure effectively causes retraction or longitudinal movement of the open end of the cylindrical valve element away from the abutment by the internal pressure, thereby permitting the fluid flow by the second valve element to the chamber and out through the other passage. Decrease of pressure within the cylindrical member returns the valve element to its original dimension thereby again effecting a sealing contact between the two valve elements. Thus, the cylindrical valve element reacts to expand slightly radially and also longitudinally away from the second valve element which normally restricts or curtails the fluid flow through said passages.

Referring now particularly to FIGURE 1, a valve is generally designated by the reference character 10 and includes a valve body 11 having a threaded bore 12 containing a valve element 13. The valve element 13 is suitably threaded as indicated at 14 and is provided at one end with a conical valve abutment designated at 15. The valve element 13 is adjustable in a threaded bore 12 and may be tightly held against rotation by means of a nut 16 provided with an annular recess 17 containing an O-ring 18 sealing the threaded bore 12 with respect to a valve chamber designated at 19.

The valve body 11 comprises a first passage 20 adapted to be suitably connected to conduit means of a hydraulic system (not shown). A threaded conduit connection 21 is provided with a threaded bore or passage 22, also forming part of a hydraulic system, the said threaded connection 21 including a tubular projection 23 having outside threads 24. The tubular projection 23 of the conduit connection 21 is supported within a collar 25 having a cylindrical threaded extension 26 screwed into a threaded bore 26' within the valve body 11. The threaded projection 23 also engages the threaded bore 23' in the collar 25. The collar 25 also includes an inner annular gripping surface 27 which may be serrated or suitably formed as shown in the subsequent figures to provide an effective gripping surface. An O-ring 28 is suitably supported on the collar 25 and within the threaded bore 26' to seal the chamber 20 against leakage.

A cylindrical valve member is designated at 29, the said valve member being of a rubber-like construction and having one end rigidly secured between the tubular projection 23 and the inner gripping portion 27 so as to firmly support said cylindrical member 29. The valve member 29 comprises an open end 30 which is in the normal position, as shown in FIGURE 1, in a closed or mating position relative to the abutment 15. The abutment 15 may be tapering, conical, curved, etc., so as to engage in mating relation the cylindrical valve member 29 and to seal the passages 20 and 22 from each other in the closed position or normal position of the valve element 29. The valve member 29 is provided with a plurality of rings or annular members designated at 31. The members 31 may be braids of relatively non-elastic material or may be metal rings, fiber, or other material which is relatively non-elastic and which will reinforce and be bonded within the rubber-like material of the valve member 29. These members 31 serve as reinforcements and impart a stiffening component to the rubber member 29. It is also contemplated that these members may be coil springs or metallic wires of torus shape to effectuate the stiffening or reinforcement desired. The valve member 29 is also provided with a pressure responsive face 32.

In the operation of the valve, fluid in the form of liquid or gas may flow in the direction of the arrows through the passage 22 and at a predetermined pressure the valve element 29 may have its open end 30 moved slightly radially to permit fluid flow past the open end through the chamber 19 through the passage 20. In view of the reinforcing elements 31, such radial movement is slight and high fluid pressure thereby causes the member 29 to move in a longitudinal direction against the fluid flow, as shown by the arrows, and thus to retract or contract relative to the abutment defined by the conical member 15. Thus, at this predetermined high pressure the fluid flow is in the direction of the arrows and the pressure relief valve is in functioning position.

The present valve, shown in FIGURE 1, is also easily adapted for fluid flow into the passage 20 through the chamber 19 and out through the passage 22. In this event, the fluid pressure against the pressure responsive face 32 provides for a retraction of the valve element 29 to again move to an open position relative to the abutment 15 permitting fluid flow out through the passage 22. Thus, it is apparent that fluid flow may be in either direction and in each case the inherent fluid pressure responsive reaction of the valve is such that it is moved longitudinally away from the abutment and slightly radially thereby substantially removing restriction to the fluid flow. Thus, it is apparent that one simple movable valve element will effectuate the desired valve function without the need of extraneous elements as found in conventional relief valve constructions.

In the modifications shown in FIGURES 2 through 6, the valve 10 is substantially similar in all respects and the same reference characters will be applied. As shown in FIGURE 2, the inner gripping portion 27 of the collar 25 is of a serrated construction since it is now gripping a cylindrical valve element 33 which may be of metallic or hardened material construction. In this case, the valve 33 is provided with a small diameter cylindrical portion 34 connected to a large diameter cylindrical portion 35, the connection which provides therebetween a shoulder 36. The large diameter portion 35 is provided with an open end 37 which is adapted to seal against the abutment 15. In operation, fluid pressure in the direction of the arrow at a predetermined point, will react upon the shoulder 36 to cause longitudinal movement of the valve portion 35 away from the abutment 15 to thereby remove the restriction and permit fluid flow through passage 20.

In FIGURE 3 a similar construction is shown as in FIGURE 2, wherein, however, a valve element 38 is provided with a cylindrical reduced diameter portion 38 immediately adjacent and in mating engagement with another valve element 13. The reduced cylindrical diameter portion 39 is joined to a large diameter portion 40 by means of an annular shoulder 41. In this case the valve element 13 is provided with an inwardly dished conical or tapering surface designated at 42 and is engaged in sealing relation as indicated. In this particular valve construction, movement of the fluid under pressure is in the direction of the arrows and the annular shoulder 41 is pressure responsive to retract the reduced diameter portion 39 thereby effecting unseating of the valve elements and providing for the fluid flow. As in previous instances, the valve element 13 is adjustable as desired relative to its relation with respect to the cylindrical valve element.

FIGURE 4 shows another modification wherein a valve element 43 is provided of a rubber or of similar material cylindrical portion 44 having a short section of metallic tube, or similar material 45 connected thereto and embedded therein as indicated at 46. The metal tube 45 is also suitably bonded to the rubber cylindrical portion 44 and provides a pair of shoulders 47 and 48 acting as pressure responsive means. The metallic tube portion 45 also includes an open end designated at 49.

In this particular arrangement, fluid flow in the direction of the arrow will react on the inner shoulder 48 to cause longitudinal movement of the opening 49 away from the abutment 15 thereby permitting the relief valve to function. On the other hand, fluid flow in the opposite direction through the passage 20 causes a pressure reaction on the shoulder 47 again causing opening of the relief valve.

In FIGURE 5 the valve element 50 comprises an open end 51 having a cylindrical bellows-like section 52 which provides for shoulders 53 and 54. Fluid flow in the direction of the arrows causes a pressure reaction on the shoulders 53 causing a retraction of the open end 51 away from the abutment 15 to thereby relieve the pressure and provide for fluid flow. The bellows-like section further permits a substantial longitudinal retraction of the valve element.

In FIGURE 6, the valve element 55 comprises a cylindrical body 56 having a reduced diameter section 57 on which a spring-like washer 58 (Belleville) is positioned. A dished valve member 59 is engaged by the washer 58 to effectuate a seal. The valve member 59 is suitably connected to adjustable screw stud 60 by means of a screw 61. Fluid pressure in the direction of the arrows will cause the axial displacement of the washer 58 from the valve member 59 to permit fluid flow through connection 20.

Thus, it can be seen that the disclosure shown in FIGURES 1 through 6 clearly provide for the desired stated objects. In all cases, a simplified pressure relief valve has been disclosed. It must be understood that changes and modifications may further be made without departing from the spirit of the invention as disclosed or from the scope thereof as defined in the appended claims.

What is claimed is:
1. A pressure relief valve comprising;
  (a) a body including a chamber,
  (b) first and second passages on said body communicating with said chamber,
  (c) a first valve element connected to said body and including a tapering end portion projecting into said chamber,
  (d) a second ring valve element projecting into said chamber and communicating with one of said first mentioned passages,
  (e) said ring valve element having an open end engaged by said projecting portion in mating relation to restrict the passage of fluid through said chamber and between said passages,
  (f) said ring valve element being longitudinally retractable in response to fluid pressure with respect to said projecting portion to provide for the flow of fluid from one passage through said chamber to said other passage,
  (g) said ring valve element having fluid pressure responsive means contained therein which during a predetermined fluid pressure on one of said passages retracts said cylindrical valve element relative to said projecting portion,
  (h) said ring valve element comprising a first portion of large diameter and another portion of a reduced diameter connected to said first portion to provide therebetween an annular shoulder defining said fluid pressure responsive means,
said portion of reduced diameter being disposed nearest to said tapering portion and said shoulder is disposed outside of said ring valve element in said chamber, said tapering portion being inwardly dished and in sealing engagement with said ring valve element.

2. A pressure relief valve comprising:
(a) a body including a chamber,
(b) first and second passages on said body communicating with said chamber,
(c) a first valve element connected to said body and including a tapering end portion projecting into said chamber,
(d) a second ring valve element projecting into said chamber and communicating with one of said first mentioned passages,
(e) said ring valve element having an open end engaged by said projecting portion in mating relation to restrict the passage of fluid through said chamber and between said passages,
(f) said ring valve element being longitudinally retractable in response to fluid pressure with respect to said projecting portion to provide for the flow of fluid from one passage through said chamber to said other passage,
(g) said ring valve element having fluid pressure responsive means contained therein which during a predetermined fluid pressure on one of said passages retracts said ring valve element relative to said projecting portion,
(h) said ring valve element comprising a first portion of large diameter and another portion of a reduced diameter connected to said first portion to provide therebetween an annular shoulder defining said fluid pressure responsive means, said large diameter portion is disposed nearest said tapering portion and said shoulder is disposed within said ring valve element.

References Cited by the Examiner
UNITED STATES PATENTS

| | | | |
|---|---|---|---|
| 465,013 | 12/1891 | Bourdil | 137—525.3 X |
| 1,746,855 | 2/1930 | French | 137—525 |
| 2,538,436 | 1/1951 | Weinberg | 137—508 X |
| 2,621,889 | 12/1952 | Aunin | 137—525 |
| 2,684,081 | 7/1954 | Chace | 137—525 X |
| 2,747,608 | 5/1956 | Grove | 137—525 |
| 2,845,088 | 7/1958 | Crausman | 137—508 |
| 2,890,838 | 6/1959 | Jannsen | 137—525 X |
| 2,938,540 | 5/1960 | Schatzman | 137—508 |
| 3,061,138 | 10/1962 | Edelmann | 137—508 X |

ISADOR WEIL, *Primary Examiner.*

WILLIAM F. O'DEA, *Examiner.*

D. ZOBKIW, *Assistant Examiner.*